(12) United States Patent
Heins et al.

(10) Patent No.: US 9,331,528 B2
(45) Date of Patent: May 3, 2016

(54) STATOR TOOTH ASSEMBLY FOR AXIAL FLUX STATOR AND METHODS OF ASSEMBLING THE SAME

(71) Applicant: REGAL BELOIT AUSTRALIA PTY LTD., Rowville, VIC (AU)

(72) Inventors: Greg Heins, Melbourne (AU); Matthew John Turner, Melbourne (AU)

(73) Assignee: Regal Beloit America, Inc., Beloit, WI (US)

( * ) Notice: Subject to any disclaimer, the term of this patent is extended or adjusted under 35 U.S.C. 154(b) by 280 days.

(21) Appl. No.: 13/832,543

(22) Filed: Mar. 15, 2013

(65) Prior Publication Data

US 2014/0265653 A1    Sep. 18, 2014

(51) Int. Cl.
| | |
|---|---|
| H02K 1/28 | (2006.01) |
| H02K 1/14 | (2006.01) |
| H02K 21/24 | (2006.01) |
| H02K 1/18 | (2006.01) |
| H02K 5/08 | (2006.01) |
| H02K 5/22 | (2006.01) |
| H02K 15/02 | (2006.01) |
| H02K 15/14 | (2006.01) |
| H02K 3/28 | (2006.01) |
| H02K 15/12 | (2006.01) |

(52) U.S. Cl.
CPC ............. *H02K 1/143* (2013.01); *H02K 1/182* (2013.01); *H02K 5/08* (2013.01); *H02K 5/225* (2013.01); *H02K 11/33* (2016.01); *H02K 15/022* (2013.01); *H02K 15/14* (2013.01); *H02K 21/24* (2013.01); *H02K 15/12* (2013.01); *H02K 2213/12* (2013.01); *Y10T 29/49009* (2015.01)

(58) Field of Classification Search
CPC ... H02K 15/0435; H02K 1/141; H02K 1/143; H02K 3/18; H02K 3/28; H02K 3/524
USPC ............................ 310/51, 216.091–216.105, 310/216.023–216.039, 216.079
See application file for complete search history.

(56) References Cited

U.S. PATENT DOCUMENTS

| | | | | |
|---|---|---|---|---|
| 3,784,850 | A | * | 1/1974 | Inaba et al. .................... 310/268 |
| 5,365,137 | A | * | 11/1994 | Richardson et al. ... 310/216.037 |
| 5,918,360 | A | * | 7/1999 | Forbes et al. .................... 29/596 |
| 5,982,070 | A | * | 11/1999 | Caamano ............... 310/216.037 |
| 6,188,159 | B1 | | 2/2001 | Fan |
| 6,853,107 | B2 | | 2/2005 | Pyntikow et al. |

(Continued)

FOREIGN PATENT DOCUMENTS

| | | |
|---|---|---|
| CN | 101976898 A | 2/2011 |
| WO | 2011026795 A1 | 3/2011 |

OTHER PUBLICATIONS

ISR/WO PCT/AU2014/000276 Filed Mar. 14, 2014 mailed Jun. 2, 2014, 8 pages.

(Continued)

*Primary Examiner* — Michael Andrews
(74) *Attorney, Agent, or Firm* — Armstrong Teasdale LLP

(57) ABSTRACT

In one aspect, a three-phase axial flux stator is provided. The stator includes a plurality of stator modules oriented in an axial direction, and each of the stator modules includes a pair of teeth connected by a yoke section. The stator also includes a plurality of windings, each of the windings wound around one of the stator modules. The stator modules and the windings produce a three-phase flux in an axial direction.

20 Claims, 9 Drawing Sheets

(56) References Cited

U.S. PATENT DOCUMENTS

| | | | |
|---|---|---|---|
| 2004/0075358 A1* | 4/2004 | Furuse et al. | 310/268 |
| 2005/0029886 A1* | 2/2005 | Van Tichelen et al. | 310/268 |
| 2009/0026875 A1* | 1/2009 | Mongeau et al. | 310/218 |
| 2010/0201210 A1* | 8/2010 | Nakayama et al. | 310/12.26 |
| 2011/0025067 A1* | 2/2011 | Cipriani | 310/209 |

OTHER PUBLICATIONS

Zhu, Z.Q., "Fractional Slot Permanent Magnet Brushless Machines and Drives for Electric and Hybrid Propulsion Systems," EVER (Ecologic Vehicles : Renewable Energies), Mar. 26-29, 2009, Monaco (11 pgs).

\* cited by examiner

– continued –

STATOR TOOTH ASSEMBLY FOR AXIAL FLUX STATOR AND METHODS OF ASSEMBLING THE SAME

BACKGROUND OF THE INVENTION

The field of the invention relates generally to electrical machines, and more particularly, to axial flux electric motors having a modular stator.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

BRIEF DESCRIPTION OF THE INVENTION

In one aspect, a three-phase axial flux stator is provided. The stator includes a plurality of stator modules oriented in an axial direction, and each of the stator modules includes a pair of teeth connected by a yoke section. The stator also includes a plurality of windings, each of the windings wound around one of the stator modules. The stator modules and the windings produce a three-phase flux in an axial direction.

In another aspect, a three-phase axial flux motor is provided. The motor includes a shaft, a rotor coupled to the shaft, at least one permanent magnet coupled to the rotor, and a three-phase axial flux stator. The stator includes a plurality of stator modules oriented in an axial direction, each of the stator modules including a pair of teeth connected by a yoke section. The stator also includes a plurality of windings, each of the windings wound around one of the stator modules.

In yet another aspect, a method of assembling a three-phase axial flux motor is provided. The method includes providing a shaft, coupling a rotor to the shaft, and coupling at least one permanent magnet to the rotor. The method further includes providing a plurality of stator modules that each include a pair of teeth connected by a yoke section, providing a plurality of windings, and winding each of the windings around a stator module of the plurality of stator modules.

DETAILED DESCRIPTION OF THE INVENTION

Figure 1:
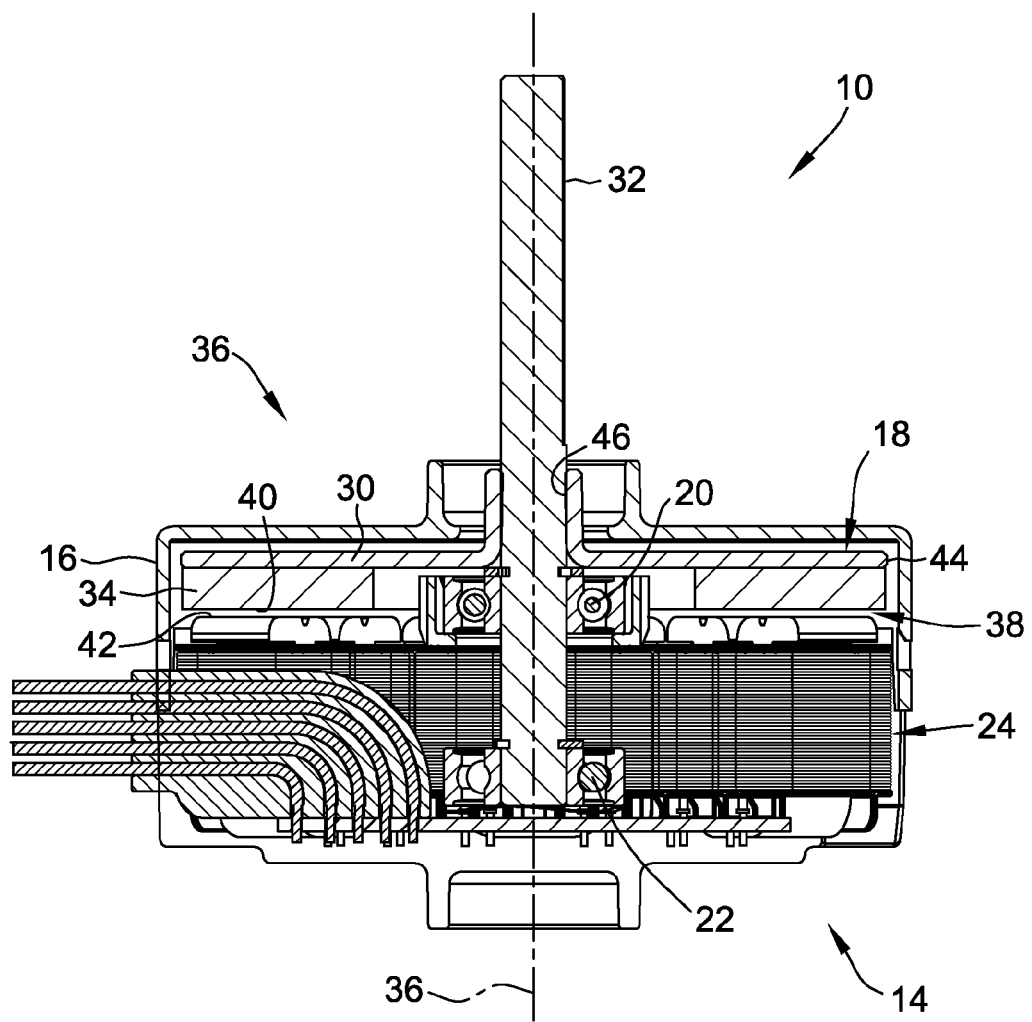
FIG. 1 is a cross-sectional view of an exemplary axial flux machine.
Figure 2:
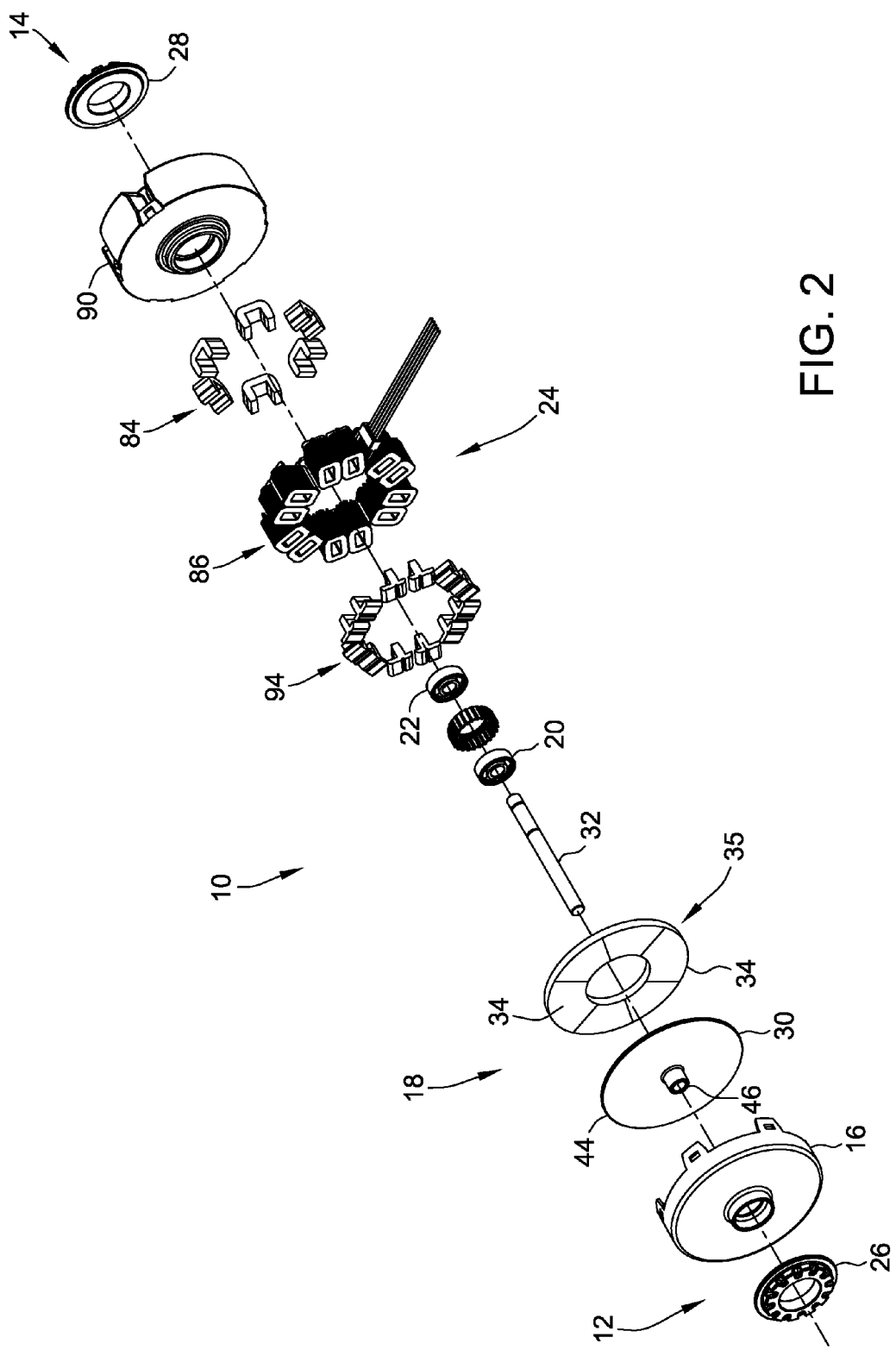
FIG. 2 is an exploded view of the axial flux machine shown in FIG. 1.

FIG. 1 is a cross-sectional view of an exemplary axial flux electric machine 10. FIG. 2 is an exploded view of axial flux electric machine 10. Components common to FIGS. 1 and 2 are identified with the same reference numerals. In the exemplary embodiment, electric machine 10 is an electric motor having a first end 12 and a second end 14. Alternatively, electric machine 10 may operate as an electric generator. Axial flux electric machine 10 generally includes a housing 16, a rotor assembly 18, a first bearing assembly 20, a second bearing assembly 22, and a stator assembly 24. A first end mount 26 is coupled to housing 16 at machine first end 12 and a second end mount 28 is coupled to stator assembly 24 at machine second end 14.

In the exemplary embodiment, rotor assembly 18 generally includes a rotor 30 coupled to a shaft 32, and a plurality of permanent magnets 34 are coupled to rotor 30. In the exemplary embodiment, permanent magnets are fabricated from neodymium and are formed as an annular magnet 35 with alternating magnetized segments 34. However, any suitable permanent magnet shape and material may be used that enables electric machine 10 to function as described herein. Rotor assembly 18 is rotatable within housing 16, and more specifically, rotatable within first bearing assembly 20 and second bearing assembly 22 about an axis of rotation 36. In the exemplary embodiment, rotor assembly 18 is driven by an electronic control (not shown), for example, a sinusoidal or trapezoidal electronic control. In the exemplary embodiment, rotor 30 is manufactured using a sintering process from, for example, Soft Magnetic Alloy (SMA) or Soft Magnetic Composite (SMC) materials. Alternatively, rotor 30 is machined and/or cast from any suitable material, for example, steel.

An air gap 38 is formed between a rotor outer surface 40 and a stator outer surface 42, and a magnetic flux within machine 10 extends between permanent magnets 34 and stator assembly 24 in a direction parallel to axis 36.

Figure 3:
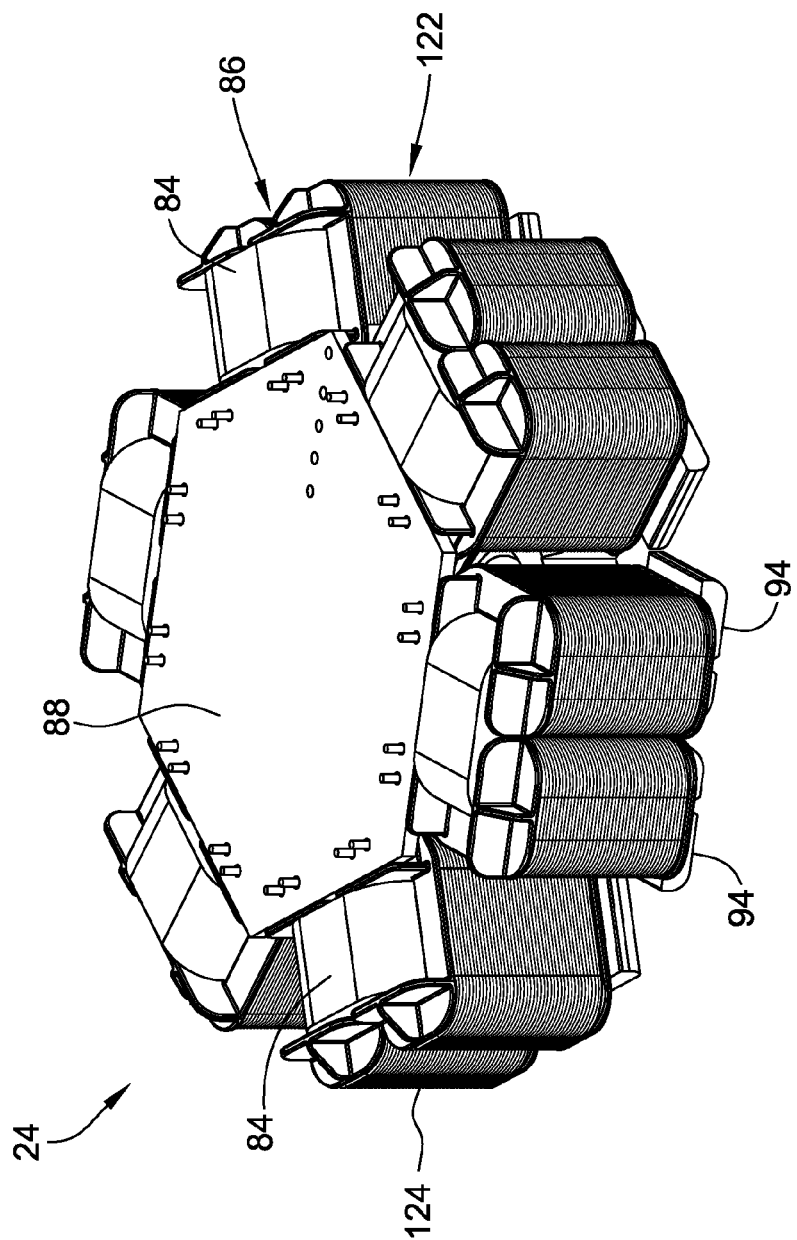
FIG. 3 is a perspective view of an exemplary stator that may be included within the axial flux machine shown in FIGS. 1 and 2.
Figure 4:
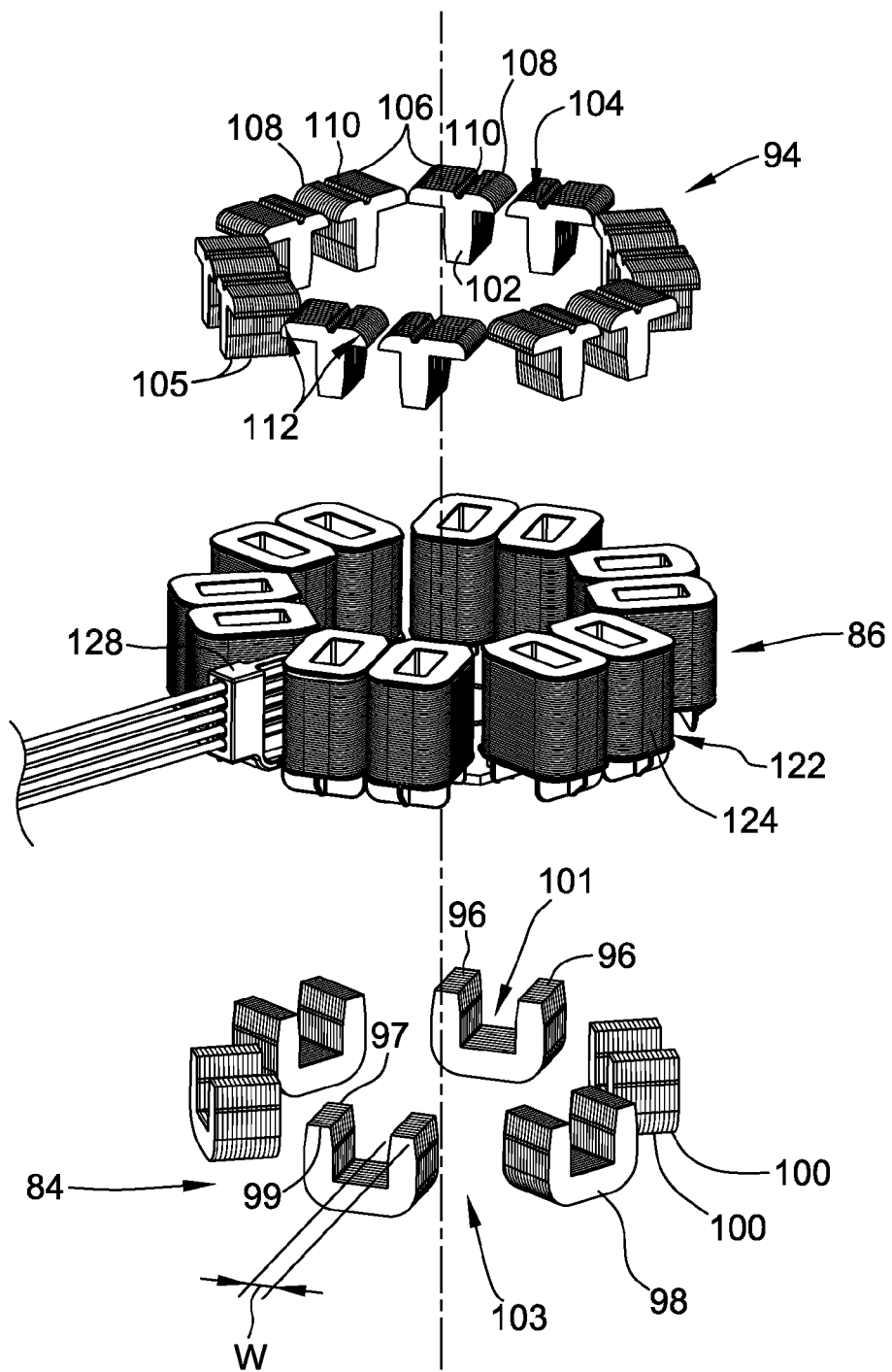
FIG. 4 is an exploded view of the stator shown in FIG. 3.
Figure 9:
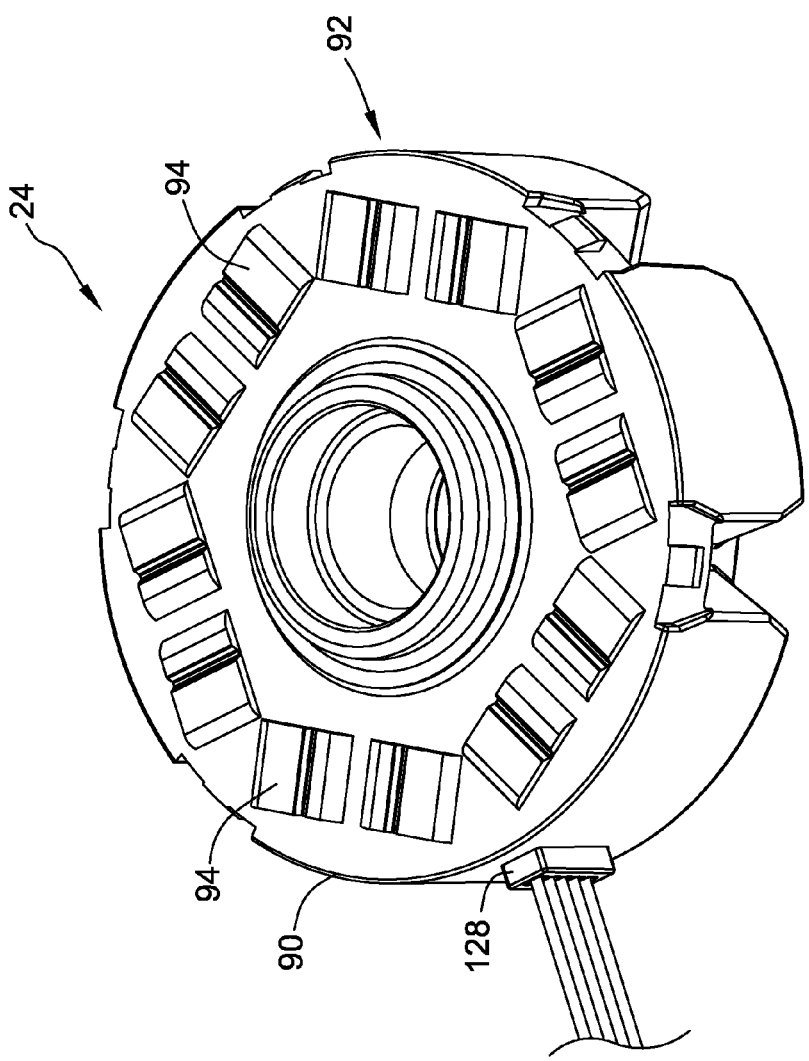
FIG. 9 is a perspective view of an exemplary packed stator that may be included within the axial flux machine shown in FIGS. 1 and 2.

FIG. 3 is a perspective view of an exemplary embodiment of stator assembly 24 shown in FIG. 2, and FIG. 4 is an exploded view of stator assembly 24. Stator assembly 24 generally includes a plurality of stator modules 84, a bobbin assembly 86, and a control board 88. Stator assembly 24 is coupled to a stator housing 90 (shown in FIG. 2) to form a packed stator 92 (shown in FIG. 9). Stator assembly 24 may also include a plurality of tooth tips 94.

In the exemplary embodiment, stator assembly 24 is a multiphase (more than one phase) axial flux stator, and is preferably a three-phase axial flux stator producing flux in the axial direction (i.e., parallel to axis of rotation 36). Stator modules 84 are generally C-shaped and include a pair of teeth 96 connected by a yoke section 98. In the exemplary embodiment, stator modules 84 are oriented in a generally axial direction such that teeth 96 extend substantially parallel to axis of rotation 36. Moreover, stator modules 84 are fabricated from a plurality of stacked laminated sheets 100. Such a construction simplifies the manufacturing process and enables modular stator modules 84 to be produced quickly and efficiently. Teeth 96 have the substantially same width w from an inner edge 97 to an outer edge 99. That is, width w of teeth 96 do not diverge from inner edge 97 to outer edge 99 like in some known stators. This enables laminated sheets 100 to be substantially identical, which lowers manufacturing costs. Further, stator modules 84 are separated from each other and oriented such that adjacent teeth 96 form alternating parallel gaps 101 and angular gaps 103. Alternatively, stator modules 84 may be solid.

In the exemplary embodiment, tooth tips 94 are generally T-shaped and include an axial member 102 and a cross member 104. Each cross member 104 includes an inward extending portion 106, an outward extending portion 108, and a groove 110. In the exemplary embodiment, tooth tips 94 are fabricated from a plurality of stacked laminated sheets 105. Such a construction simplifies the manufacturing process and enables modular tooth tips 94 to be produced quickly and efficiently. In the exemplary embodiment, outward extending portion 108 has a greater length than inward extending portion 106. Tooth tips 94 also include rounded portions 112 to reduce noise by reducing the harmonic content of the back electromagnetic field (EMF) and cogging torque. Tooth tips 94 are generally aligned with a corresponding tooth 96 and increase flux density in stator assembly 24 and reduce the length of a winding 122 (FIG. 8) needed for assembly 24.

Figure 5:
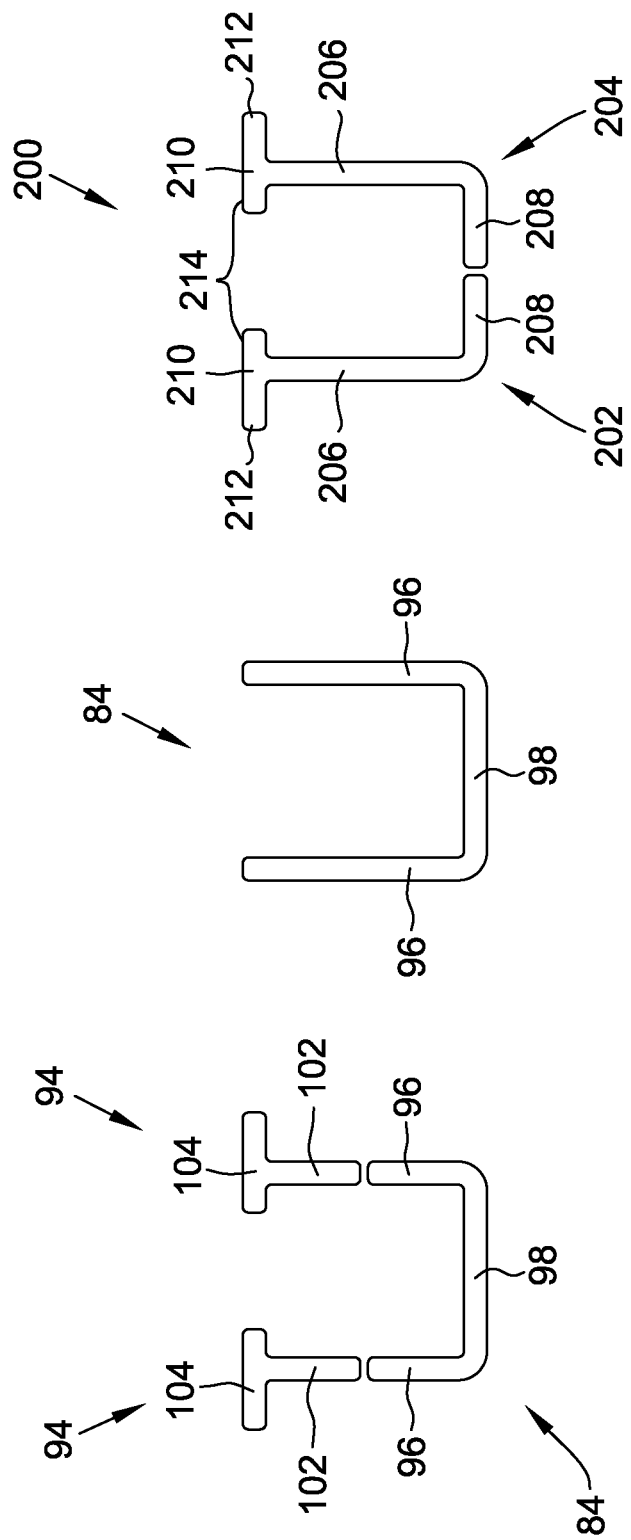
FIG. 5 is a front view of exemplary stator modules that may be included with the axial flux machine shown in FIGS. 1 and 2.

FIG. 5 illustrates various embodiments of the stator modules including stator module 84 with tooth tips 94, stator module 84 alone, and a stator module 200 that is similar to the configuration of stator module 84 with two tooth tips 94. Stator module 200 is formed form a plurality of stacked laminations (not shown) and includes a first section 202 and a second section 204. Each section 202, 204 includes a tooth 206 coupled to a yoke section 208 and a cross member 210. Each cross member 210 includes an outward extending portion 212 and an inward extending portion 214. In the exemplary embodiment, outward extending portion 212 has a greater length than inward extending portion 214.

Figure 6:
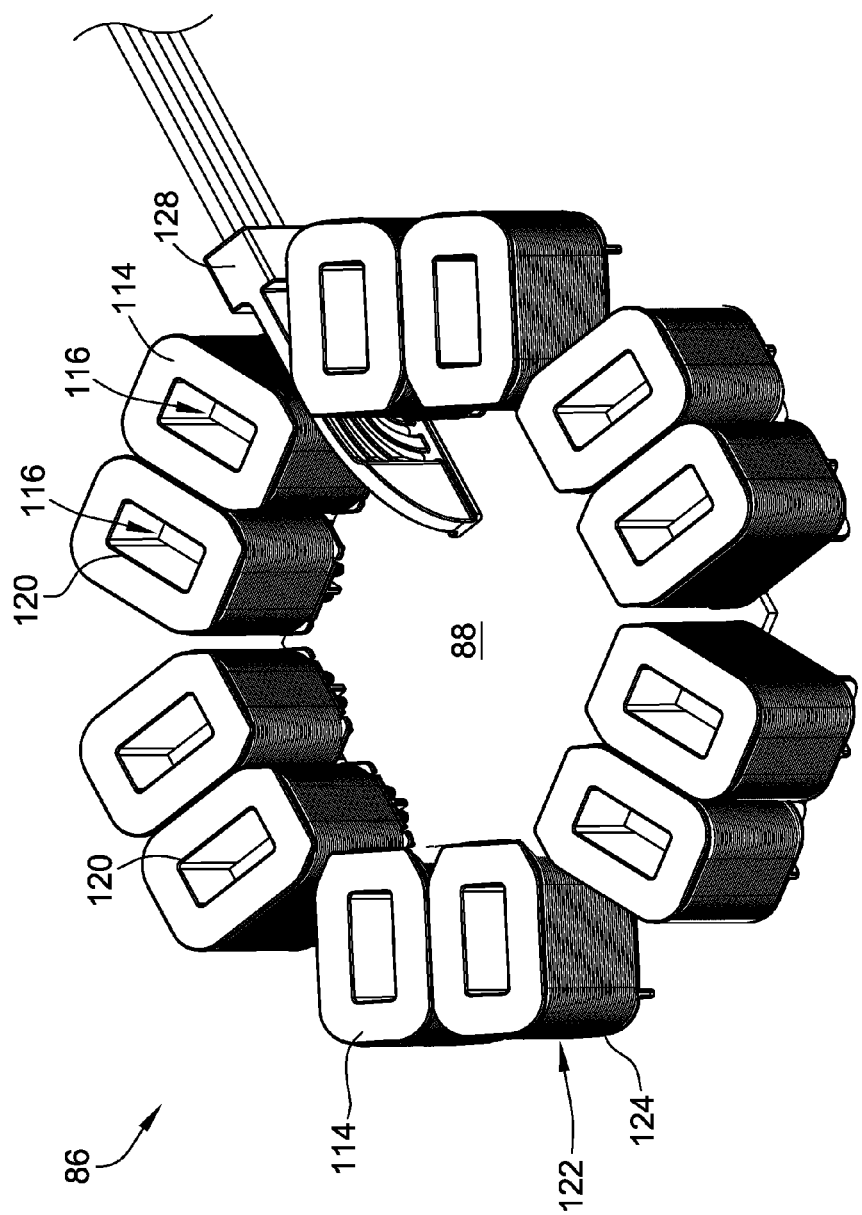
FIG. 6 is a top perspective view of an exemplary bobbin assembly that may be included within the axial flux machine shown in FIGS. 1 and 2.
Figure 7:
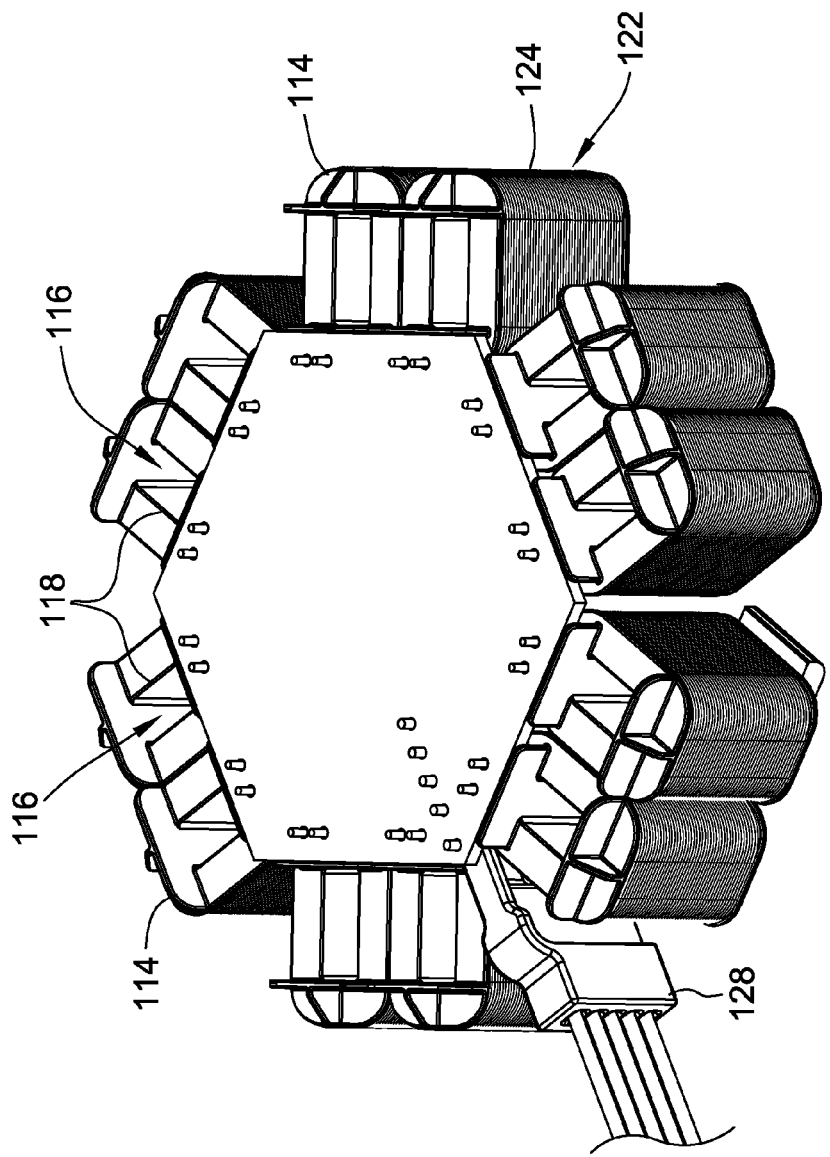
FIG. 7 is a bottom perspective view of the bobbin assembly shown in FIG. 6.

FIGS. 6 and 7 are respective relative top and bottom perspective views of exemplary bobbin assembly 86 that may be included within electric machine 10. Bobbin assembly 86 generally includes a plurality of bobbins 114 coupled to control board 88. Although twelve bobbins 114 are illustrated, bobbin assembly 86 may include any number of bobbins that enables machine 10 to function as described herein. Each bobbin 114 includes an opening 116 that closely conforms to an external shape of stator module teeth 96 and tooth tip axial member 102. For example, stator module tooth 96 is configured to be positioned at least partially within a first end 118 of opening 116, and tooth tip axial member 102 is configured to be positioned at least partially within a second end 120 of opening 116. Machine 10 may include one bobbin 114 for every tooth 96, one bobbin 114 positioned on every other tooth 96, and/or one bobbin 114 positioned on yoke section 98.

Figure 8:
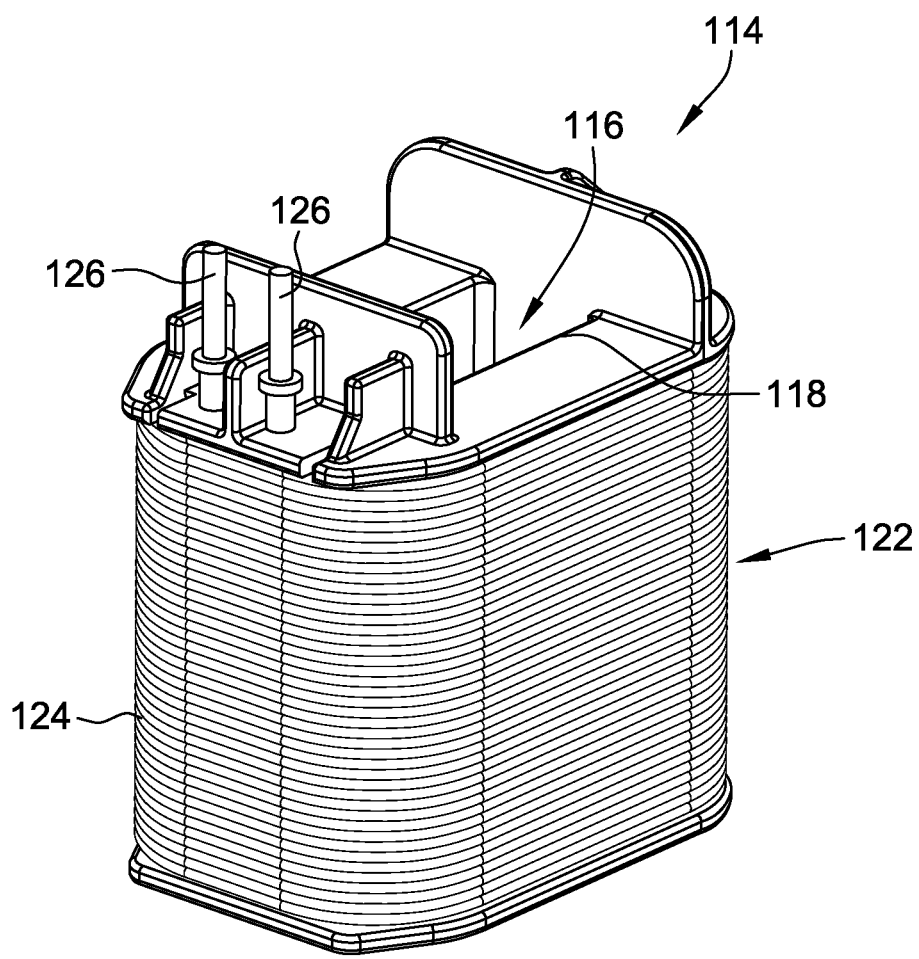
FIG. 8 is a perspective view of an exemplary bobbin that is included within the bobbin assembly shown in FIGS. 6 and 7.

FIG. 8 is a perspective view of exemplary bobbin 114 that may be included in bobbin assembly 86. In the exemplary embodiment, bobbin assembly 86 also includes electrical winding 122 that includes a plurality of coils 124. In the exemplary embodiment, winding 122 is made up of twelve coils 124 and creates a twelve-pole stator. Each coil 124 is wound around a respective bobbin 114, which electrically isolates coil 124 from stator module 84 and tooth tip 94. Alternatively, each coil is directly wound in a generally vertical direction (i.e., generally parallel to rotation axis 36) around at least one of stator module teeth 96 and tooth tip axial member 102, and/or directly wound in a generally horizontal direction (i.e., generally orthogonal to rotation axis 36) around yoke section 98.

In the exemplary embodiment, coils 124 are wound around bobbins 114, and each coil 124 includes two ends, a start and a finish to the coil. Bobbins 114 are coupled to control board 88 by pins 126. In the exemplary embodiment, control board 88 is a printed circuit board (PCB), and each end of each of coil 124 is coupled to control board 88 using an insulation displacement terminal (not shown) designed for directly soldering into control board 88. Alternatively, any other suitable connector may be used that enables the plurality of bobbins 114 to be coupled to control board 88. In the exemplary embodiment, control board 88 includes a wiring connector 128 for directly connecting control board 88 to a motor control board (not shown). In an alternative embodiment, control board 88 is incorporated within a motor control board, thereby eliminating redundant mounting and connectors.

Assembling stator assembly 24 includes winding a winding 122 around a plurality of bobbins 114, and bobbins 114 are coupled to a control board 88. A plurality of stator modules 84 having a pair of teeth 96 connected by a yoke section 98 are coupled to one or more bobbins 114. Specifically, at least a portion of tooth 96 is inserted into a bobbin opening 116. A plurality of tooth tips 94 having an axial member 102 and a cross member 104 are coupled to one or more bobbins 114. Specifically, at least a portion of axial member 102 is inserted into bobbin opening 116. Stator modules 84 and tooth tips 94 may be fabricated from a plurality of laminated sheets 100. Stator assembly 24 is then coupled to stator housing 90. In the exemplary method, stator assembly 24 is placed in a mold (not shown) having location features. Tooth tips 94 include a groove 110, which engages the mold location features to correctly align stator assembly 24 within the mold. A suitable material (e.g., a resin) is then molded around stator assembly 24 to form a packed stator 92 (shown in FIG. 9). The exemplary method further includes coupling rotor 30 to a shaft 32 and positioning a rotor outer surface 40 adjacent a stator outer surface 42 to form an air gap 38 therebetween.

Described herein are exemplary methods and systems for axial flux machines. The axial flux machines include a rotor having axially embedded permanent magnets. The axially embedded rotor design enables the use of lower-cost ferrite magnets, while achieving the power densities and higher efficiency of other rotor designs that use higher-cost neodymium magnets. Further, the axial flux machines include a multiphase stator having substantially similar stator modules and substantially similar tooth tips made from economical laminations, which enables a modular construction. The stator module teeth are substantially similar and have the substantially same width such that the fabrication processes is simplified and hastened, and no cogging torque is created. The tooth tips increase flux concentration and reduce noise. Accordingly, a lower-cost, axial flux machine is described herein that provides quicker production with minimal impact on efficiency and performance.

Exemplary embodiments of the axial flux electric machine assembly are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A three-phase axial flux stator comprising:
   a plurality of stator modules oriented in an axial direction, each of said stator modules comprising a pair of teeth connected by a yoke section;
   a plurality of tooth tips, each tooth tip aligned with and does not contact one tooth of said stator modules, each tooth tip comprising an axial member and a cross member, said cross member comprising an inward extending portion and an outward extending portion, wherein a length of said outward extending portion is greater than a length of said inward extending portion; and
   a plurality of windings, each of said windings wound around one of said stator modules, wherein said stator modules and said windings produce a three-phase flux in an axial direction.

2. The three-phase axial flux stator of claim 1, wherein each of said windings is wound in a vertical direction around one tooth of one of said stator modules.

3. The three-phase axial flux stator of claim 2, further comprising a plurality of bobbins, each bobbin coupled to one tooth of one of said stator modules, wherein each of said windings is wound around one of said bobbins.

4. The three-phase axial flux stator of claim 2, wherein each of said windings is wound in a vertical direction around one of said teeth and at least a portion of one of said tooth tips to couple said tooth tip to said stator module.

5. The three-phase axial flux stator of claim 4, further comprising a plurality of bobbins, each bobbin coupled to one tooth of one of said stator modules and one of said tooth tips, wherein each of said windings is wound around one of said bobbins.

6. The three-phase axial flux stator of claim 1, wherein said stator modules are generally C-shaped, said tooth tips are generally T-shaped, and at least one edge of said T-shaped tooth tip is rounded to reduce noise.

7. The three-phase axial flux stator of claim 6, wherein said plurality of stator modules and said plurality of tooth tips are fabricated from a plurality of stacked laminations.

8. The three-phase axial flux stator of claim 1, further comprising a molded stator housing, wherein said plurality of stator modules is molded within said stator housing.

9. The three-phase axial flux stator of claim 1, wherein each of said plurality of stator modules are spaced from one another such that adjacent teeth form alternating parallel gaps and angular gaps.

10. A three-phase axial flux motor comprising:
    a shaft;
    a rotor coupled to said shaft;
    at least one permanent magnet coupled to said rotor; and
    a three-phase axial flux stator comprising:
      a plurality of stator modules oriented in an axial direction, each of said stator modules comprising a pair of teeth connected by a yoke section;
      a plurality of tooth tips, each tooth tip aligned with and does not contact one tooth of said stator modules, each tooth tip comprising an axial member and a cross member, said cross member comprising an inward extending portion and an outward extending portion, wherein a length of said outward extending portion is greater than a length of said inward extending portion; and
      a plurality of windings, each of said windings wound around one of said stator modules.

11. The three-phase axial flux motor of claim 10, wherein said motor comprises a number of said stator teeth that is different than a number of said permanent magnets.

12. The three-phase axial flux motor of claim 10, further comprising a plurality of bobbins, wherein said bobbins are coupled to said stator module teeth, and said windings are wound around said bobbins.

13. The three-phase axial flux motor of claim 12, wherein said tooth tips are coupled to said bobbins.

14. The three-phase axial flux motor of claim 13, wherein said plurality of stator modules and said plurality of tooth tips are fabricated from a plurality of stacked laminations.

15. The three-phase axial flux motor of claim 10, wherein said stator modules are generally C-shaped and said tooth tips are generally T-shaped.

16. A method of assembling a three-phase axial flux motor, said method comprising:
    providing a shaft;
    coupling a rotor to the shaft;
    coupling at least one permanent magnet to the rotor;
    providing a plurality of stator modules that each include a pair of teeth connected by a yoke section;
    providing a plurality of tooth tips, each tooth tip aligned with and does not contact one tooth of the stator modules, each tooth tip including an axial member and a cross member, the cross member including an inward extending portion and an outward extending portion, wherein a length of the outward extending portion is greater than a length of the inward extending portion;
    providing a plurality of windings; and
    winding each of the windings around a stator module of the plurality of stator modules.

17. The method of claim 16, further comprising positioning the plurality of stator modules and the at least one winding in a mold and molding a stator body around the plurality of stator modules and the plurality of windings.

18. The method of claim 16, further comprising coupling at least one bobbin to one of the stator module teeth, wherein said winding each of the windings comprises winding at least one winding around the at least one bobbin.

19. The method of claim 18, further comprising coupling a tooth tip to the at least one bobbin.

20. The method of claim 19, further comprising fabricating the plurality of stator modules and the at least one tooth tip from a plurality of stacked laminations.

* * * * *